United States Patent
Weber et al.

(10) Patent No.: US 9,533,890 B2
(45) Date of Patent: Jan. 3, 2017

(54) PROCESS FOR PRODUCING AND PROCESSING A PASTE-LIKE SIO₂ COMPOSITION, AND THE USE THEREOF

(71) Applicant: Heraeus Quarzglas GmbH & Co. KG, Hanau (DE)

(72) Inventors: Jürgen Weber, Kleinostheim (DE); Norbert Traeger, Maintal (DE); Gerrit Scheich, Seligenstadt (DE); Waltraud Werdecker, Hanau (DE); Christian Schenk, Ingelheim (DE); Joachim Peekhaus, Bad Orb (DE); Kerstin Meyer-Merget, Alzenau (DE); Sebastian Pankalla, Seeheim-Jugenheim (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 94 days.

(21) Appl. No.: 14/383,526

(22) PCT Filed: Mar. 7, 2013

(86) PCT No.: PCT/EP2013/054573
§ 371 (c)(1),
(2) Date: Sep. 5, 2014

(87) PCT Pub. No.: WO2013/131995
PCT Pub. Date: Sep. 12, 2013

(65) Prior Publication Data
US 2015/0050419 A1 Feb. 19, 2015

(30) Foreign Application Priority Data

Mar. 9, 2012 (DE) .................. 10 2012 004 564

(51) Int. Cl.
*C01B 33/12* (2006.01)
*C01B 33/157* (2006.01)
(Continued)

(52) U.S. Cl.
CPC ........... *C01B 33/1417* (2013.01); *B05D 5/005* (2013.01); *B82Y 30/00* (2013.01); *C01B 33/158* (2013.01);
(Continued)

(58) Field of Classification Search
CPC ........ C01B 33/113; C01B 33/12; C01B 33/14; C01B 33/1417; C03C 3/06; C03C 3/076; B05D 5/005; B05D 2203/35; B05D 2601/22
(Continued)

(56) References Cited

U.S. PATENT DOCUMENTS 4,042,361 A * 8/1977 Bihuniak ................ C03B 19/06
501/55
6,660,671 B2 12/2003 Werdecker et al.
(Continued)

FOREIGN PATENT DOCUMENTS

CN 101600663 A * 9/2009
DE 69227448 T2 1/1999
(Continued)

OTHER PUBLICATIONS

Espacenet English language abstract of DE 10344189 A1, published Feb. 24, 2005.
(Continued)

*Primary Examiner* — William Phillip Fletcher, III
(74) *Attorney, Agent, or Firm* — Tiajoloff & Kelly LLP

(57) ABSTRACT

The invention relates to a process for producing a paste-like SiO₂ composition using an SiO₂ slip which allows simple intermediate storage and transport conditions without the
(Continued)

processability of the slip to give the paste-like $SiO_2$ composition being impaired thereby. According to the invention, it is for this purpose proposed that a homogeneous $SiO_2$ base slip be subjected to a drying step to form a dry $SiO_2$ composition and subsequently be processed further by means of a remoistening step to give the paste-like $SiO_2$ composition, where the remoistening step comprises the addition of liquid to the dry $SiO_2$ composition to form a paste-like kneadable $SiO_2$ composition having a solids content of more than 85% by weight. The invention further relates to the use of a paste-like $SiO_2$ composition as repair composition.

12 Claims, 1 Drawing Sheet

(51) Int. Cl.

| | | |
|---|---|---|
| *C01B 33/187* | (2006.01) | |
| *C01B 33/141* | (2006.01) | |
| *B05D 5/00* | (2006.01) | |
| *C03C 3/076* | (2006.01) | |
| *C03B 19/06* | (2006.01) | |
| *C01B 33/158* | (2006.01) | |
| *B82Y 30/00* | (2011.01) | |
| *C03C 8/02* | (2006.01) | |
| *C03C 17/25* | (2006.01) | |

(52) U.S. Cl.
CPC ............ *C03B 19/066* (2013.01); *C03C 3/076* (2013.01); *C03C 8/02* (2013.01); *C03C 17/25* (2013.01); *B05D 2203/35* (2013.01); *B05D 2601/22* (2013.01); *C01P 2004/64* (2013.01); *C03C 2205/00* (2013.01); *C03C 2217/213* (2013.01); *C03C 2218/11* (2013.01); *C03C 2218/30* (2013.01)

(58) Field of Classification Search
USPC .......................................................... 427/140
See application file for complete search history.

(56) References Cited

U.S. PATENT DOCUMENTS

| | | |
|---|---|---|
| 8,158,542 B2 | 4/2012 | Werdecker et al. |
| 8,209,998 B2 | 7/2012 | Werdecker et al. |
| 2003/0119648 A1 | 6/2003 | Werdecker et al. |
| 2009/0151848 A1 | 6/2009 | Werdecker et al. |
| 2009/0266110 A1 | 10/2009 | Werdecker et al. |
| 2011/0039983 A1 | 2/2011 | Kuehner |
| 2012/0114847 A1 | 5/2012 | Werdecker et al. |

FOREIGN PATENT DOCUMENTS

| | | | |
|---|---|---|---|
| DE | 10114484 A1 | | 10/2002 |
| DE | 103 44 189 A1 | * | 2/2005 |
| DE | 10344189 A1 | | 2/2005 |
| DE | 10 2006 046619 A1 | * | 4/2008 |
| DE | 102006046619 A1 | | 4/2008 |
| EP | 1136119 A1 | | 3/2001 |
| EP | 2 070 886 A1 | * | 6/2009 |
| EP | 2070886 A1 | | 6/2009 |
| WO | 2009127438 A1 | | 10/2009 |

OTHER PUBLICATIONS

Espacenet English language abstract of EP 2070886 Al, published Jun. 17, 2009.
Espacenet English language abstract of DE 102006046619 A1, published Apr. 3, 2008.
Espacenet English language abstract of DE 10114484 A1, published Oct. 17, 2002.
Espacenet English language abstract of EP 1136119 Al, published Sep. 26, 2001.
Espacenet English language abstract of DE 69227448 T2, published Jul. 1, 1999.

* cited by examiner

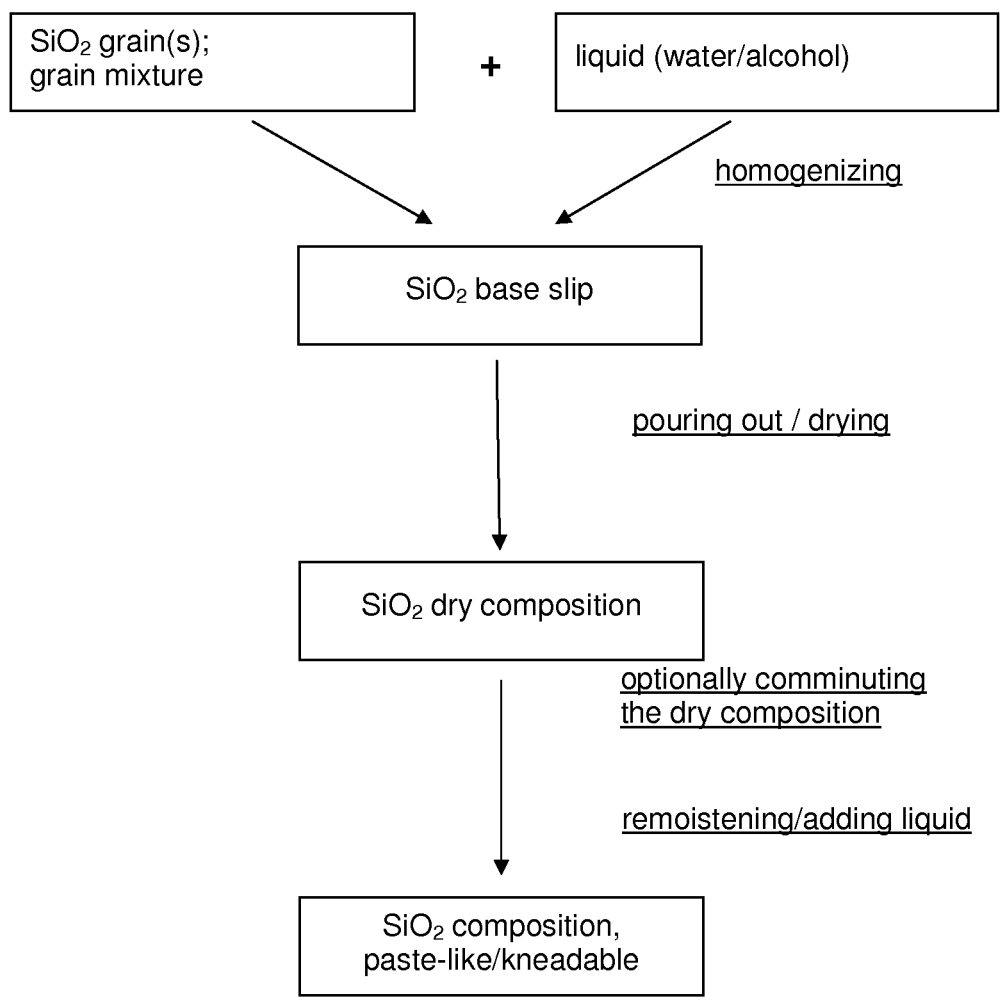

PROCESS FOR PRODUCING AND PROCESSING A PASTE-LIKE SIO$_2$ COMPOSITION, AND THE USE THEREOF

The present invention refers to a process for producing a paste-like SiO$_2$ composition using a homogenized SiO$_2$ base slip with a solids content of SiO$_2$ particles in the range of 80% by wt. to 90% by wt. Furthermore, the present invention refers to the use of a paste-like SiO$_2$ composition.

PRIOR ART

The so-called slip casting method is in common use in ceramic process engineering for producing ceramic or vitreous components, especially also for producing quartz glass components. A slip casting method for producing a composite material with a high SiO$_2$ content is known from DE 101 14 484 A1. An aqueous thin suspension with amorphous silica dust and at least two further SiO$_2$ particle fractions is mixed in a ball mill and processed into a homogeneous slip. This slip is processed in standard die-casting methods into a SiO$_2$ green body and molded in this process. Alternatively, the slip according to DE 101 14 484 A1 can be shaped by gel-forming components, such as e.g. ammonium fluoride, into a pressable composition.

It is known from DE 10 2006 046 619 A1 to produce a SiO$_2$ slip on an alcohol base with a high filling degree by adding SiO$_2$ raw material components with a matching particle size distribution, which slip is easy to spread or spreadable by a doctor blade. The slip is processed by means of a doctor blade device which is connected to a slip storage container.

WO 2009127438 A1 discloses surface-modified SiO$_2$ particles and silica sol containing said SiO$_2$ particles. The surface-modified SiO$_2$ particles are to show improved redispersibility in specific organic solvents, particularly in toluene. For the production of the surface-modified SiO$_2$ particles modification agents are added to aqueous silica sol with a water content of more than 50% by wt., so that the SiO$_2$ particles are occupied on their surface by organofunctional groups. To carry out this process in an efficient manner, water is removed prior to reaction with the modification agent, so that the total content of water in the silica sol may be below 15% by wt. in the end. This is optionally followed by the addition of ion exchangers and a renewed dilution with isopropanol before the silica sol is vacuum-dried at 40-50° C. and is obtained as a surface-modified SiO$_2$ powder. The SiO$_2$ powder obtained in this way can be easily redispersed in toluene without any agglomeration taking place. Upon redispersion the solids content in the silica sol is 10% by wt.

EP 1 136 119 A1 is also concerned with improving the redispersion of SiO$_2$ granulate. A combination of freeze drying and spray freezing is suggested. As the start suspension, an aqueous SiO$_2$ suspension with a solids content of 25% by wt. is atomized in liquid nitrogen, followed by sublimation drying. An almost spherical SiO$_2$ granulate is obtained in this process. The SiO$_2$ granulate is again dispersed in water by stirring and ultrasonic treatment. The solids content of the redispersed suspension is about 0.4% by wt. An analysis of the particle size distribution shows that the granulate fraction is fully redispersible under the conditions applied.

DE 692 27 448 T2 also refers to a process for producing a redispersible nanoscale SiO$_2$ powder by hydrolysis of tetraethoxysilane in an aqueous reaction solution. The polysilicic acid particles obtained are isolated and dried and are easily redispersible in water or in polar organic solvents with ultrasound support. Drying is carried out in the individual case also as a combination of freeze drying and drying in vacuum at 120° C.

TECHNICAL OBJECTIVE

The most recently explained processes serve to produce SiO$_2$ particles or granulates of high redispersibility. The desired end product is the SiO$_2$ powder and the SiO$_2$ granulate, respectively.

The invention, however, refers to SiO$_2$ slips and their further processing. The said SiO$_2$ slips according to the prior art are suited by virtue of optimized particle size distributions and filling degree of the suspension for different processing methods besides the standard slip casting. However, the slip must be further processed promptly after homogenization so as to be able to benefit from the optimized slip characteristics. The reason is that the slip consistency may change due to storage or transportation so that a production with stockage of a liquid slip is only possible under great efforts.

It is therefore the object of the present invention to indicate a process for producing a paste-like SiO$_2$ composition using a SiO$_2$ slip which allows simple intermediate storage and transport conditions without the processability of the slip to give the paste-like SiO$_2$ composition being impaired thereby. Furthermore, it is the object of the present invention is to indicate a suitable use of the paste-like SiO$_2$ composition.

GENERAL DESCRIPTION OF THE INVENTION

The above object is achieved according to the invention with respect to the process in that the SiO$_2$ base slip is subjected to a drying step to form a dry SiO$_2$ composition and is subsequently processed further by means of a remoistening step to give the paste-like SiO$_2$ composition, wherein the remoistening step comprises the addition of liquid to the dry SiO$_2$ composition to form a paste-like kneadable SiO$_2$ composition having a solids content of more than 85% by weight.

A base slip consisting of a suspension of SiO$_2$ particles in a liquid medium is processed by mechanical action, such as stirring or grinding in a ball mill, into a homogeneous SiO$_2$ base slip. The solids content of said base slip is in the range of 80% by wt. to 90% by wt.

The particle size distribution of the SiO$_2$ particles and their grain shape have an influence on the flow properties of the base slip and also in the end on the sintering behavior after final finishing of the SiO$_2$ slip. A portion of small amounts of SiO$_2$ nanoparticles with particles sizes of less than 100 nm has an influence on the flow behavior of the slip in that a constant viscosity of the slip is thereby adjusted at a constant stirring speed. As a rule, the homogenizing step covers a period of several days. It is standard to homogenize the SiO$_2$ base slip for at least 6 to 12 days or even more on a roller block.

Immediately after the homogenization step the SiO$_2$ base slip is now dried into a solid composition by pouring the slip into a shallow bowl and allowing it to stand in a drying cabinet at room temperature or at an elevated temperature.

The dried composition can be stored on site without any great efforts and can also be transported easily in this state, for there is no sedimentation in this state.

Likewise, the influence of the storage and transport temperature which would be of great importance to a flowable base slip is here of minor importance. The storage or transport temperature for the dried base slip is acceptable in a wide temperature range of −40° C. to about +50° C. and thus also contributes to an inexpensive manufacturing process.

As soon as the $SiO_2$ composition has to be applied to a component or has to be made moldable in another way, the dry $SiO_2$ composition is comminuted and remoistened by adding liquid. This yields a kneadable $SiO_2$ composition with a solids content of more than 85% by wt. If the solids content is below 85% by wt., the dimensional stability is declining with respect to the pasty or kneadable consistency of the $SiO_2$ composition, so that the corresponding processing can no longer be carried out in an optimum way, and there is the risk that cracks will form during drying. This remoistening yields a $SiO_2$ composition which is moldable with very simple means and which has a paste-like or kneadable consistency.

This composition can be applied with one's hands or with simple scrapers or spatulas to a substrate. Surprisingly, even an addition of liquid which adjusts the solids content to that of the original $SiO_2$ base slip does not lead to the rheological behavior of the original castable base slip; rather, a plasticine-like composition is formed. This noticeable property is ascribed to interactions between the $SiO_2$ particles among one another, which have previously taken place during homogenization and drying, and to the physico-chemical conditions and interactions between the $SiO_2$ particles and the liquid during remoistening. Specifically, the introduction of OH groups which attach to the $SiO_2$ particles seems to be of importance and gives the remoistened composition a special flow property.

Advantageously, the $SiO_2$ base slip is an aqueous or alcoholic suspension.

A mixture of alcohol and water, e.g. an ethanol-water mixture, is also advantageous in the individual case because the moistening properties are thereby positively influenced with respect to the $SiO_2$ particles on the one hand and the drying properties of the $SiO_2$ base slip on the other hand. Due to the increased vapor pressure of alcohols in comparison with water, a base slip based on an alcoholic suspension is particularly suited if the drying time and temperature have to be minimized. When the dry composition is remoistened, both alcohol and water can be used. The selection depends substantially on how fast the further processing of the paste-like or kneadable $SiO_2$ composition is to take place, wherein compositions remoistened by alcohol have to be processed within a few minutes as they re-dry very rapidly. This, however, can certainly be of advantage with respect to a productive manufacture.

A $SiO_2$ base slip with a solids content of 85% by wt. to 88% by wt. has turned out to be particularly advantageous in the processing into a kneadable $SiO_2$ composition.

Furthermore, it has proved to be useful when the solids content is composed of different $SiO_2$ particle fractions. For instance, a combination of granulates consisting of nanoscale amorphous $SiO_2$ with an amount of coarse-grained $SiO_2$ granules is qualified to optimize the later sintering behavior of the paste-like $SiO_2$ composition.

A further advantageous design of the invention consists in that the $SiO_2$ base slip comprises a so-called $SiO_2$ sol which is adjusted by addition of $SiO_2$ particles to a solids content in the range of 80% by wt. to 90% by wt.

The starting material is a $SiO_2$ sol consisting of colloidal $SiO_2$ nanoparticles with particle sizes of less than 100 nm, preferably in the range of 12 nm to 20 nm, which are dispersed in water or isopropanol (or other alcohols). A small amount of $SiO_2$ granules is admixed to this $SiO_2$ sol, and one obtains a $SiO_2$ base slip with a solids content in the range of 80% by wt. to 90% by wt. in a simple way. Adding small amounts of sintering aids or other additives may further be of advantage.

To optimize the $SiO_2$ base slip, said slip is homogenized for at least six days by stirring and/or grinding, normally in a ball mill on a roller block.

As an alternative, however, it has also turned out to be useful in the case of $SiO_2$ base slips containing a $SiO_2$ sol to carry out homogenization in a vacuum kneader. When vacuum is used, possible gas inclusions are removed in the slip, resulting in an optimized slip.

The drying step advantageously comprises pouring the $SiO_2$ base slip into a shallow bowl in which the slip is dried at a relatively fast pace into a firm block.

It has turned out to be useful when a drying rate is set in the range of 3% to not more than 10% weight loss per minute. In the case of small slip amounts a residual moisture of less than equal to 50% is achieved with this drying rate after about 5 to not more than 15 minutes for the dry $SiO_2$ composition As for the drying step, it is further advantageous to carry out the drying of the $SiO_2$ base slip at temperatures in the range of about 20° C. (room temperature) to about 120° C.

In alcoholic base slips the drying operation can be carried out at room temperature or at an only slightly raised temperature due to the high vapor pressure. When alcoholic slips are dried, attention must however be paid that the environment is explosion-proof.

To safely reduce the residual moisture to zero, it is preferred that the drying step is carried out at room temperature for at least 12 hours.

Advantageously, a drying phase of 24 hours at room temperature has to be allowed for slips based on alcohol because there is no need for a drying cabinet or other heating units and there is no longer any significant residual moisture with these drying parameters.

Before the drying composition is remoistened, the drying composition is advantageously first comminuted coarsely and then comminuted with a few grinding bodies of quartz glass in a movably supported plastic bottle into a powder without considerably changing the $SiO_2$ particle size set in the original base slip.

An optimal comminuting of the dry composition is achieved by this comminuting step, e.g. in a so-called tubular mixer, for a duration of about 4 to 8 hours without the risk of any input of objectionable foreign matter.

It has turned out to be advantageous for the remoistening step when liquid is added in the form of water or alcohol or a mixture of water and alcohol to the previously comminuted dry $SiO_2$ composition.

It has turned out to be useful when the remoistening is carried out by dripping or pouring liquid without the help of a tool, but by mixing the liquid with the comminuted dry composition by hand, with corresponding gloves (nitrile gloves) being worn for avoiding contaminations.

This procedure is particularly recommended when only small amounts of less than a kilogram are remoistened.

EMBODIMENTS

The invention shall now be explained in detail with reference to embodiments. As the sole FIGURE FIG. 1 shows a flow diagram of the process according to the invention.

EXAMPLE 1

A homogeneous base slip is produced. For a batch of 10 kg $SiO_2$ base slip, 8.2 kg of amorphous quartz-glass granules of natural raw material with grain sizes in the range between 250 μm and 650 μm are mixed with 1.8 kg deionized water with a conductivity of less than 3 μS in a quartz glass-lined drum mill with a nominal volume of 20 liters. This mixture is ground by means of grinding balls of quartz glass on a roller block at 23 rpm for a duration of 16 hours to such an extent that a homogenous base slip is formed with a solids content of 80%. The $SiO_2$ grain particles obtained after grinding of the quartz glass granules are of a splintery type. Further amorphous $SiO_2$ granules with particles sizes of around 5 μm are added to this slip until a solids content of 85% by wt. is achieved. This mixture is again homogenized in a drum mill for 12 hours at a speed of 25 rpm. For applications making particularly high demands on the stability and homogeneity of the kneading composition of the invention, a longer homogenization duration is set or, as a supplement thereto, a dry premixing of the $SiO_2$ powder is intended, as shall be explained in more detail further below with reference to Example 2.

The slip obtained thereby has a solids content of 85% and a density of 2.0 g/cm³. This $SiO_2$ base slip is now poured into shallow containers of special steel or into plastic bowls, wherein a fill level of about 3 cm is achieved. The containers filled in this way are put into a drying cabinet. The composition is dried at 50° C. for a duration of 12 hours. Under these conditions the drying rate within the first 30 minutes is about 8% per minute, based on the initial higher moisture content at the beginning of the measurement period.

The dry composition easily detaches from the container and is first coarsely comminuted by hand. About 200 g are then put together with 6 grinding balls into a 2-liter plastic bottle and kept in a tubular mixer for 6 hours in a tumbling motion. The powder of the dry composition obtained thereby is filled for storage into hermetically sealable bottles. In this form the prepared dry composition is storable for a virtually infinite time and can be transported without any trouble also in containers of a large size.

For the processing of a $SiO_2$ kneadable composition for repair purposes, just a small amount of prepared dry composition has to be remoistened. It is here enough to weigh 10 g of the prepared dry composition and to drip said amount with 1.2 g deionized water with a conductive value of less than 3 μS by means of a pipette onto the $SiO_2$ dry composition. The mixing of the dry composition with water is carried out by manual kneading within a few minutes; nitrile gloves are here worn for avoiding contaminations, particularly the input of alkalis. The paste-like $SiO_2$ composition applied in this way has a solids content of about 89% by wt. It dries at a very fast pace and is subsequently sintered with a standard sintering program at 1200° C. for about 3 hours.

EXAMPLE 2

As an alternative to the $SiO_2$ base slip indicated in Example 1, an ethanol-based slip is produced by weighing in 1.5 kg synthetic quartz glass granules with a mean particle size between 5 μm and 30 μm, and 50 g $SiO_2$ nanoparticles with a mean particle size of 50 nm and by homogenizing with 290 ml ethanol on the roller block for 12 days.

The synthetic quartz glass granules have a spherical grain shape. The solids content of said $SiO_2$ base slip is about 87%.

The homogenization treatment of the slip which lasts for several days and preferably for at least 12 days effects a decrease in the pH value to less than 5.

In an alternative procedure the $SiO_2$ powder to be added to the slip is premixed in a dry state in advance for 0.5 hours or more, e.g. in a tumble mixer. In this case a much shorter homogenization period from six days on the roller block is sufficient for an adequate homogenization and stabilization of the slip.

The slip which is homogenized in the one or the alternative way is distinguished by a high stability in the sense of a low tendency to demixing or settlement and by flow properties that would also advantageously permit its direct use as a casting or application slip.

For the production of the kneadable composition according to the invention this is now followed by drying in that the base slip is cast into shallow bowls and allowed to stand at room temperature for 24 hours. The weight loss or the drying rate is in this case within the first 30 minutes about 4-5% per minute, based on the initial moisture content at the beginning of the measurement. This creates a block of $SiO_2$ dry composition with a thickness of about 12 mm, which—as illustrated in Example 1—is first coarsely and then finely comminuted, so that the resulting pulverized dry $SiO_2$ composition can be stored in bottles in an airtight manner.

Remoistening is carried out in the same way as shown in Example 1. The remoistened paste-like $SiO_2$ composition is e.g. used for the repair of quartz glass components with an opaque $SiO_2$ surface layer. For this purpose a thin layer is applied in the region of the surface layer to be repaired, dried to obtain a so-called green body layer and subsequently sintered in a known manner in a sintering furnace at a temperature of around 1200° C. to obtain a crack-free homogeneous $SiO_2$ layer.

EXAMPLE 3

Amorphous $SiO_2$ granules with particle sizes of about 5 μm are admixed to $SiO_2$ sol, which is commercially available from the company Fuso Chemical Co., Ltd., in isopropanol with the designation PL1-IPA and a $SiO_2$ amount of 12.5% with particle sizes of less than 100 nm until a solids content of 85% by wt. is achieved. This mixture is homogenized and de-aired in a vacuum kneader. The resulting homogeneous $SiO_2$ base slip has a solids content of 85% and a density of 2.0 g/cm³. This alcoholic $SiO_2$ base slip is now poured out into shallow containers of special steel or into plastic bowls, resulting in a fill level of 2 cm to 3 cm.

The containers filled in this way are dried at room temperature for 12 hours or alternatively in an explosion-proof drying cabinet at 40° C. for one hour. The dry $SiO_2$ composition is then comminuted in the same manner and remoistened as indicated in Example 1. This remoistened paste-like $SiO_2$ composition can also be used for repair purposes, as explained in Example 2.

The invention claimed is:
1. A process for producing a paste-like $SiO_2$ composition, said process comprising:
provisioning a homogenized $SiO_2$ base slip with a solids content of $SiO_2$ particles in a range of 80% by wt. to 90% by wt.,
subjecting the $SiO_2$ base slip to a drying step so as to form a dry $SiO_2$ composition, and remoistening the dry $SiO_2$ composition so as to yield the paste-like $SiO_2$ composition, wherein the remoistening comprises adding liquid to the dry $SiO_2$ composition so as to form the paste-like $SiO_2$ composition, wherein the paste-like $SiO_2$ composition has a solids content of more than 85% by weight; and wherein the remoistening comprises dripping or pouring liquid onto the dry $SiO_2$ composition and distributing the liquid in the dry $SiO_2$ composition by kneading.

2. The process according to claim 1, wherein the $SiO_2$ base slip is an aqueous and/or alcoholic suspension.

3. The process according to claim 1 wherein the $SiO_2$ base slip has a solids content of 85% by wt. to 88% by wt.

4. The process according to claim 1, wherein the $SiO_2$ base slip comprises a $SiO_2$ sol that is adjusted by adding $SiO_2$ particles to have a solids content in a range of 80% by wt. to 90% by wt.

5. The process according to claim 1, wherein the $SiO_2$ base slip is homogenized in a vacuum kneader.

6. The process according to claim 1, wherein the drying step comprises pouring the $SiO_2$ base slip, with the $SiO_2$ base slip having a drying rate in a range of 3% to 10% weight loss per minute.

7. The process according to claim 1, wherein the drying step takes place at temperatures in a range of 20° C. to 120° C.

8. The process according to claim 1, wherein the drying step is carried out at room temperature for at least 12 hours.

9. The process according claim 1, wherein the dry $SiO_2$ composition is comminuted in an at least one comminuting step prior to the remoistening.

10. The process according to claim 1, wherein the remoistening is carried out by adding liquid in the form of water or alcohol or a mixture of water and alcohol onto the dry $SiO_2$ composition.

11. The process according to claim 1, wherein the kneading comprises manual kneading.

12. A process for repairing an article, said process comprising:

producing a paste-like $SiO_2$ composition according to the process according to claim 1, and applying the paste-like SiO2 composition to the article as a repair composition.

* * * * *